United States Patent [19]

Graves et al.

[11] Patent Number: 4,994,909
[45] Date of Patent: Feb. 19, 1991

[54] VIDEO SIGNAL DISTRIBUTION SYSTEM

[75] Inventors: Alan F. Graves, Kanata; Robert C. Dittburner, Stittsville; Barry B. Hagglund, Nepean, all of Canada

[73] Assignee: Northern Telecom Limited, Montreal, Canada

[21] Appl. No.: 347,136

[22] Filed: May 4, 1989

[51] Int. Cl.[5] .................... H04N 7/173; H04N 7/14; H04J 15/00
[52] U.S. Cl. ............................. 358/86; 370/4; 455/5
[58] Field of Search ............... 358/86; 455/3-6; 370/4

[56] References Cited

U.S. PATENT DOCUMENTS

| | | | |
|---|---|---|---|
| 4,441,180 | 4/1984 | Schüssler | 358/86 X |
| 4,530,008 | 7/1985 | McVoy | 358/86 X |
| 4,538,174 | 8/1985 | Gargini et al. | 358/86 |
| 4,547,804 | 10/1985 | Greenberg | 358/142 |
| 4,686,667 | 8/1987 | Ohnsorge | 370/4 |
| 4,760,442 | 7/1988 | O'Connell et al. | 358/86 |
| 4,769,833 | 9/1988 | Farleigh et al. | 358/86 X |
| 4,831,616 | 5/1989 | Huber | 370/4 X |

Primary Examiner—Jin F. Ng
Assistant Examiner—Wing F. Chan
Attorney, Agent, or Firm—R. John Haley; Dallas F. Smith

[57] ABSTRACT

A signal distribution system is disclosed for distributing television program signals from a central location to a plurality of subscriber locations via respective optical fibers. At the central location, 4 of 64 signals are selected and multiplexed for delivery to each subscriber location. At each subscriber location, an interface unit selects any 2 of the 4 signals for delivery to each of a plurality of video port controllers, for supply to an associated television receiver and video cassette recorder. Requests for program signals initiated by a subscriber at a video port controller are handled by the interface unit, being granted, denied, or fowarded to the central location as appropriate. The system facilitates the provision of pay-per-channel and pay-per-view television program signals.

9 Claims, 5 Drawing Sheets

VIDEO SIGNAL DISTRIBUTION SYSTEM

This invention relates to a signal distribution system for distributing video signals from a central location to a plurality of subscriber locations via respective communications paths.

BACKGROUND OF THE INVENTION

It is well known to distribute television program signals from a central location to subscriber locations via coaxial cable distribution systems. Whilst such systems have long been used for broadcast television program signals, i.e. signals which are available to all subscribers without payment of further fees, they must be supplemented or modified to accommodate newer video signal services, such as pay-per-channel (PPC) and pay-per-view (PPV) television program signals. In addition, such systems have a limited capacity, i.e. a limited number of program channels which can be carried, because all of the channels available to all of the subscribers must be broadcast simultaneously.

With PPC signals, commonly the signal is scrambled at the central location and, for a payment of a fee for the channel, the subscriber is provided with a descrambler for use at his location to return the signal to its normal, receivable, form. Such procedures have led to the existence of unauthorized descramblers enabling subscribers to receive programs without payment of the fee for the channel, and to the theft of authorized scramblers.

With PPV television program signals, similar or more complex scrambling procedures may be used, but there is an additional requirement for the subscriber to communicate to the central location his desire to receive, and his agreement to pay for, a particular program. This communication requires an upstream communications path from the subscriber location to the central location, in addition to the downstream communications path via which the television program signals are distributed. Such an upstream communications path is not conveniently provided by cable distribution systems, and generally must be provided via other equipment, such as the telephone system or other equipment at the subscriber's location. Furthermore, the communications and addressable decoders which are involved with PPV signals lead to undesirable congestion in broadcast networks.

In each of these instances, the fact that the television program signals are distributed in a general manner from the central location to all of the subscriber locations means that control of the signals by their distributor is lost, and the signals are exposed to theft with consequent loss of revenues.

With increasing bandwidths available on communications paths which have conventionally served for only telephone communications, for example through the use of optical fiber communications paths and especially the extension of such paths from a central location to subscriber locations, it is increasingly becoming possible to use such communications paths not only for telephone communications but also for other services, such as video signal distribution, enabling the provision of cable distribution systems to subscriber locations to be dispensed with.

Accordingly an object of this invention is to provide an improved signal distribution system for distributing video signals.

SUMMARY OF THE INVENTION

According to this invention there is provided a signal distribution system for distributing video signals from a central location to a plurality of subscriber locations via respective communications paths, the system comprising: means at the central location for selecting for each subscriber location, from a first plurality of signals, a second, lesser, plurality of signals and for delivering said second plurality of signals to the subscriber location via a respective communications path; and, at each subscriber location: a plurality of control means each for supplying a respective video signal to at least one respective video signal receiver associated therewith; and interface means coupled to the respective communications path and to each control means for delivering respective video signals thereto.

In an embodiment of the invention described in detail below, the means at the central location is constituted by a video services switching unit (VSS) and, for each subscriber location, each control means is constituted by a video port controller (VPC) and the interface means is constituted by an optical network interface unit (ONI).

The interface means preferably comprises means for supplying to each control means a third plurality, less than the second plurality, of video signals. Advantageously the first, second, and third pluralities of video signals comprise at least about 64, 4, and 2 video signals respectively. These numbers enable each subscriber location to have simultaneous access to 4 of a total of 64 video signals, with any 2 of the 4 signals being simultaneously supplied to each control means for delivery for example to a co-located television receiver and video cassette recorder.

Preferably the control means comprises means for requesting delivery of any of the first plurality of signals and for communicating such request to the interface means, and the interface means comprises means responsive to such request for selectively: delivering the requested signal to the respective control means if the requested signal is one of said second plurality of signals delivered thereto via the respective communications path; and communicating a request for the requested signal to the central location to be delivered as one of the second plurality of signals.

Conveniently each communications path comprises a digital signal communications path, the system further comprising at the central location means for supplying each of the first plurality of signals as a digital signal. This facilitates the provision of multiplexed digital signals, each with baseband video quality, to a co-located television receiver and VCR associated with each control means. In this case each control means preferably comprises means for converting a respective digital video signal delivered thereto into an analog video signal for supply to the respective video signal receiver. Advantageously the communications paths comprise optical fibers.

To facilitate selection, delivery, and confirmation of signals, preferably the system includes at the central location means for multiplexing with each selected signal an identification of the selected signal.

The invention also extends to a method of distributing television program signals from a central location selectively to a plurality of subscriber locations, comprising the steps of:

at a plurality of points at a subscriber location, requesting television program signals for delivery thereto;

at the central location, selecting for the respective subscriber location a plurality of requested television program signals from a larger number of available television program signals;

supplying the selected signals from the central location to the subscriber location via a respective communications path; and at a central point at the subscriber location, receiving requests for television program signals from said plurality of points, receiving the selected signals from the central location via the respective communications path, delivering requested television program signals received from the central location to said plurality of points in dependence upon the received requests, and communicating to the central location requests for selecting television program signals at the central location for supply to the subscriber location.

BRIEF DESCRIPTION OF THE DRAWINGS

The invention will be further understood from the following description with reference to the accompanying drawings, in which.

DETAILED DESCRIPTION OF THE PREFERRED EMBODIMENT

Figure 1:
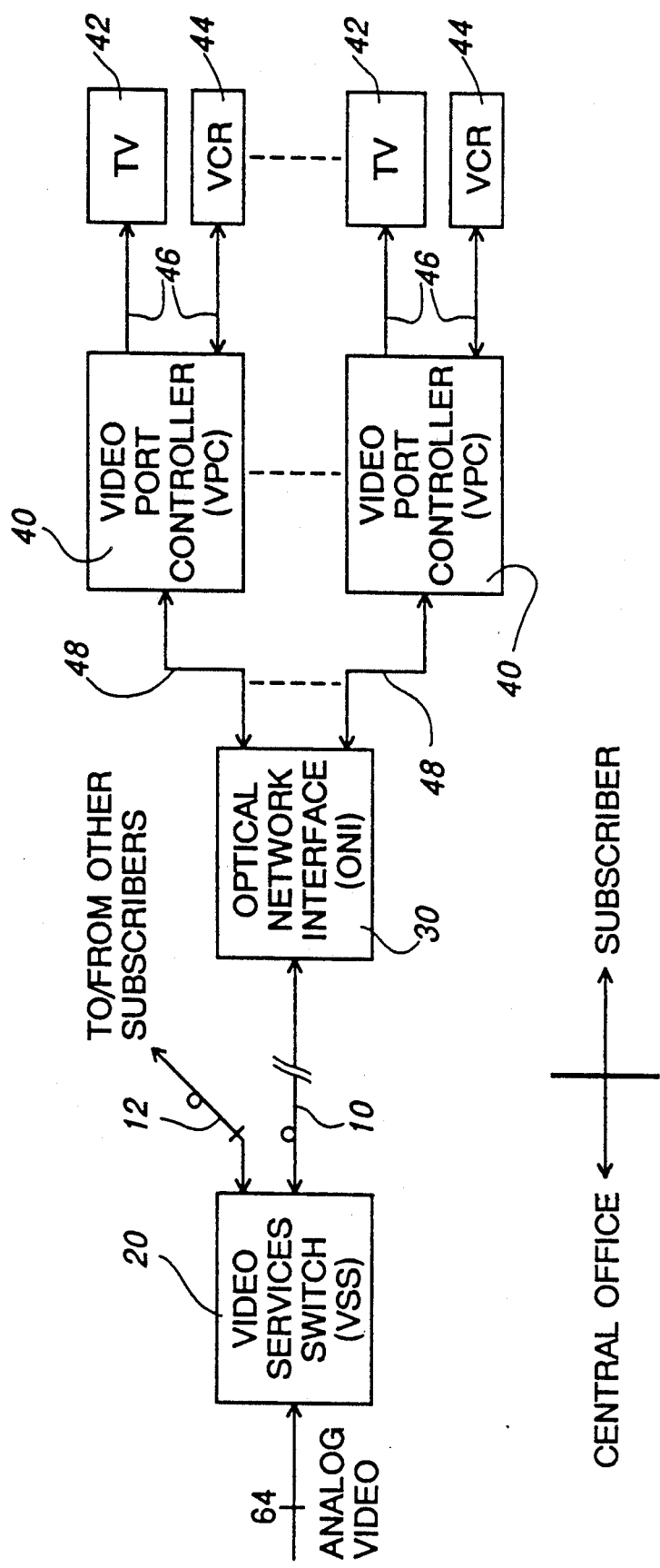
FIG. 1 is a block diagram illustrating parts of a video signal distribution system in accordance with an embodiment of this invention.

Referring to FIG. 1, a video signal distribution system will be described. The term "video signal" as used herein is intended to embrace wide bandwidth signals generally, of which video signals are typical, and not merely signals whose sole purpose is to provide a visual picture. In particular, this term is used herein to embrace all of the components, video and audio, of a conventional television signal.

The distribution system of FIG. 1 includes a video services switching unit, or VSS, 20 which is located conveniently with respect to subscribers of the system. By way of example, the VSS 20 may be co-located with a telephone central office which provides telephone and other communications services for the same subscribers. For simplicity, FIG. 1 shows components of only one subscriber, including an optical network interface unit, or ONI, 30 which is coupled to the VSS 20 via a bidirectional single mode optical fiber 10. The optical fiber 10 is representative of a bidirectional wideband communications path between the VSS 20 and the ONI 30, which may alternatively have other forms such as electrical cables, multiple unidirectional optical fibers, and so on, which may serve not only for the video signal distribution system described herein but also for the other communications services for the subscriber. As indicated in FIG. 1, other optical fibers 12 couple the VSS 20 to ONIs 30 of other subscribers; for example there may be 128 or more ONIs 30 coupled to one VSS 20.

As also illustrated in FIG. 1, the VSS 20 is supplied with, for example, 64 analog video channels. For example, three comprise television program signals from a CATV source supplied in known manner via an analog video patch panel.

For each subscriber, the system of FIG. 1 includes not only the ONI 30 but also one or more, for example up to 8, video port controllers, or VPCs, 40, two of which are illustrated in FIG. 1. Each VPC 40 is located in the vicinity of a respective television receiver (TV) 42 and/or video cassette recorder (VCR) 44 of the subscriber. The TVs 42 and VCRs 44 are of conventional form and are not part of the distribution system itself; they are connected to the respective VPCs 40 via conventional coaxial cables 46. Each VPC 40 is connected via a respective coaxial cable 48 to the ONI 30.

By way of example, for a residential subscriber the ONI may be located in a garage of the subscriber's residence, and different rooms of the residence may each include a respective VPC 40 with a TV 42 and a VCR 44 connected thereto. Within the designed limits of the distribution system which will become evident from the description below, each such TV 42 and each such VCR 44 may receive any of the 64 television program signals via the respective units 20, 30, and 40. These designed limits include, in particular, a limit of 4 different program signals which can be simultaneously carried on the optical fiber 10 to any particular subscriber.

Figure 2:
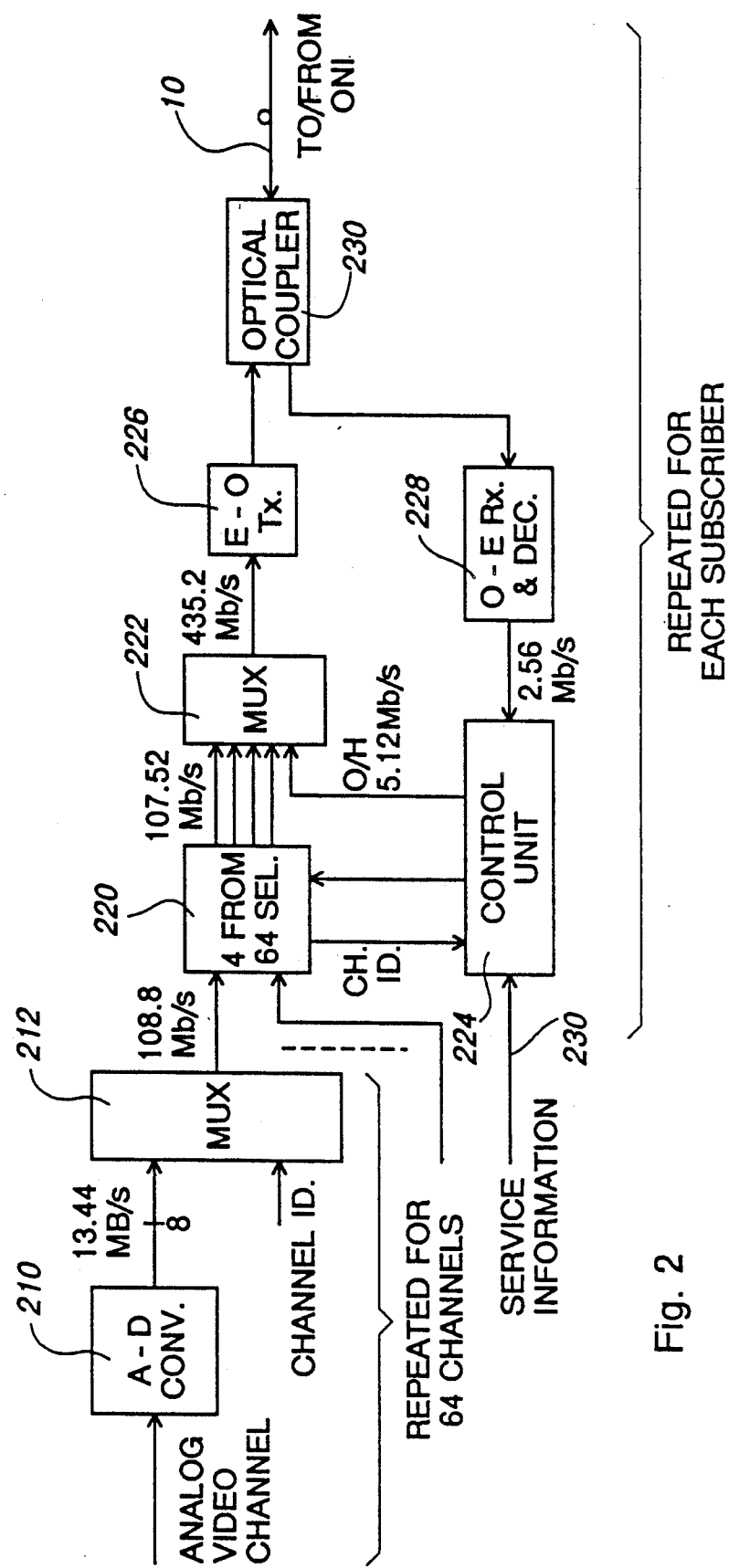
FIG. 2 is a block diagram illustrating a video services switching unit (VSS) of the system of FIG. 1.

Referring now to FIG. 2, the VSS 20 will be described in more detail. As illustrated in FIG. 2, the VSS comprises an analog to digital converter (ADC) 210 and a multiplexer 212 in respect of each of the 64 analog video channels. In addition, the VSS includes, for each subscriber, a respective selector 220, multiplexer 222, control unit 224, electro-optical transmitter (Tx) 226, opto-electrical receiver (Rx) and decoder 228, and directional optical coupler 230.

Each ADC 210 serves to convert the respective incoming analog video signal into a digital video signal, with for example 8-bit bytes at a rate of 13.44MB/s (megabytes per second) which are supplied to the multiplexer 212. Although various forms of television signal ADC are known and may be used, each ADC is preferably of the form described and claimed in U.S. Pat. No. 4,825,286 issued Apr. 25, 1989 in the name of A.F. Graves and entitled "Digitization of Video Signals". In such an ADC, the modulated audio signal is summed with the picture signal of a television program and the summed signal is sampled at a relatively high sampling rate, typically more than three times the color subcarrier frequency, synchronously related to a rate at which the digitized samples are to be transmitted.

Figure 5:
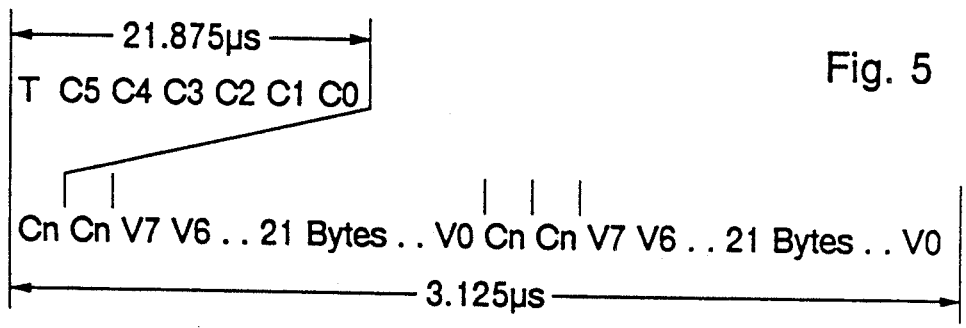
FIG. 5 illustrates a tdm (time division multiplexed) frame format of a digitized video signal.

The 13.44MB/s digital video signal, having a bit rate of 107.52Mb/s (megabits per second), is multiplexed by the multiplexer 212 with a channel identity (ID) also supplied to the multiplexer, to produce a multiplexed digital video signal at a bit rate of 108.8Mb/s having a tdm frame format which is illustrated in FIG. 5.

As shown in FIG. 5, each frame has a period of 3.125us (microseconds) and thus comprises 340 bits. The 340 bits in each frame are constituted by 42 bytes of the 13.44MB/s video signal, the 8 bits of each byte being represented in FIG. 5 by the bits V7, V6, ...V0 in order of decreasing significance, and 4 identical bits each represented Cn in FIG. 5. Over a superframe period of 21.875us or 7 frames, each Cn bit has a value represented sequentially in FIG. 5 as T, C5, C4, ...C0. T represents a toggle bit which has a value alternating between 1 and 0 in successive superframes, and the 6 bits C5 to C0 represent the channel identity. As $2^6=64$, these 6 bits allow each of the 64 analog video channels to be uniquely identified.

Figure 6:
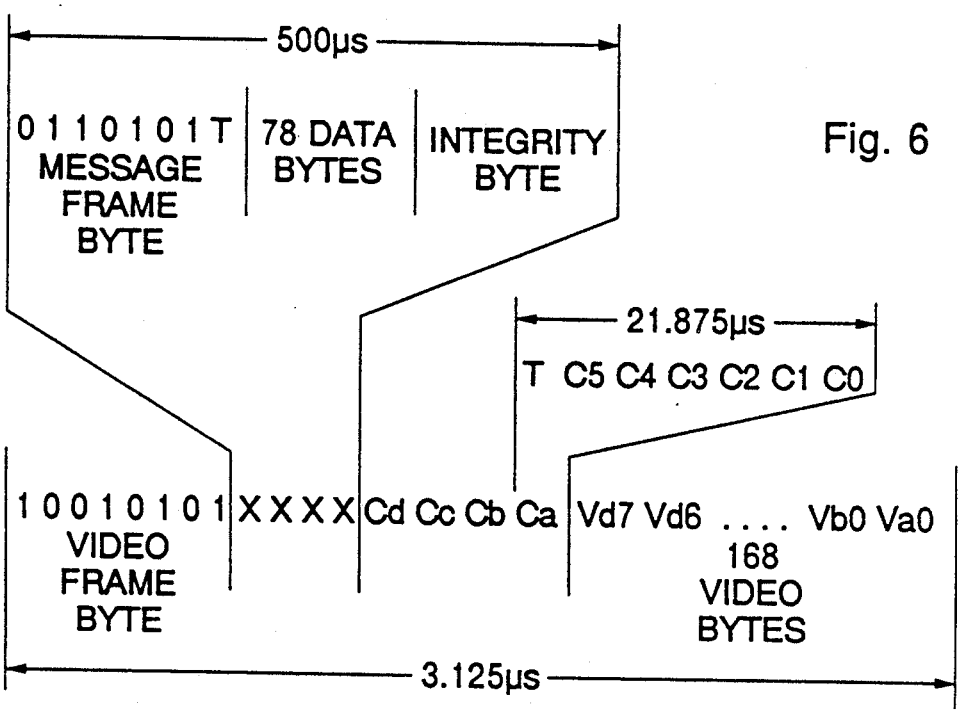
FIG. 6 illustrates a tdm frame format of a VSS-to-ONI signal.

Referring again to FIG. 2, each selector 220 is supplied with all 64 digitized video signals and serves, under the control of its control unit 224 as described further below, to select 4 of these and supply them to the multiplexer 222. The channel identities are supplied to the control unit 224 and are replaced, in the signals multiplexed by the multiplexer 222, by overhead information (O/H) at a corresponding bit rate of 5.12Mb/s. Consequently the multiplexer 222 multiplexes 4 digital video signals from the selector 220 at an average bit rate of 107.52Mb/s with the 5.12Mb/s overhead information to produce a multiplexed signal at a bit rate of 435.2Mb/s, having a frame format as shown in FIG. 6. This downstream (i.e. in the direction from the VSS to the ONI and VPC) signal is transmitted optically by the transmitter 226 and is coupled to the fiber 10 via the coupler 230. An upstream signal on the fiber 10 and having a bit rate of 2.56Mb/s is coupled via the coupler 230 to the receiver and decoder 228 and thence to the control unit 224. In addition, the control unit 224 is supplied via a line 230, for example from CATV equipment (not shown), with information for each subscriber as to video signal channels available to the subscriber, in accordance with which the control unit 224 maintains in memory a service provisioning map for the subscribers.

Referring to FIG. 6, the downstream signal frame format consists of frames each with a period of 3.125us and hence comprising 1360 bits or 170 bytes. Of these, the first 16 bits or 2 bytes are constituted by the overhead information, and the remaining 1344 bits or 168 bytes are constituted by 42 bytes of each of the 4 selected digital video signals. These video bytes are bit interleaved as shown by FIG. 6; thus denoting the 4 selected video signals or channels as a, b, c, and d, video signal bits Vd7, Vc7, Vb7, Va7, Vd6, etc. are multiplexed in sequence as shown in FIG. 6.

The 16 bits of overhead information comprise a video frame byte, 10010101 as shown in FIG. 6, followed by 4 bits X and 4 bits Cd, Cc, Cb, and Ca. The latter 4 bits (C bits) represent the channel identities of the selected channels d to a respectively, in superframe periods of 21.78us, as shown in FIG. 5, in exactly the same manner as in FIG. 5. The 4 bits X in each frame constitute a downstream message channel at a bit rate of 1.28Mb/s. As shown in FIG. 6, over a superframe period of 500us (160 3.125us frames) this message channel provides a frame of 80 bytes, comprising a message frame byte which, except for an alternating or toggle bit T, is the inverse of the video frame byte, 78 data bytes, and a final integrity (parity) byte.

Figure 3:
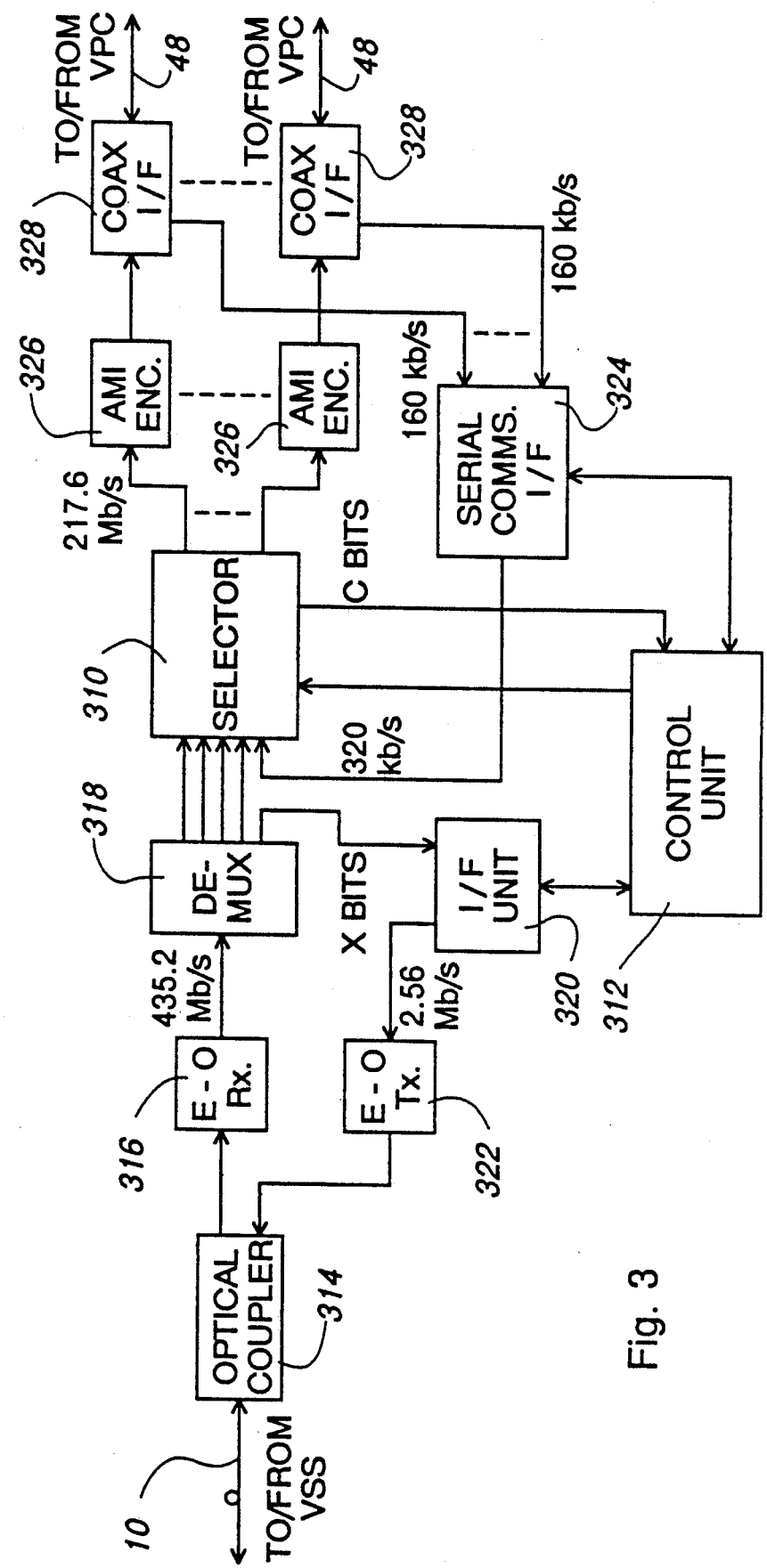
FIG. 3 is a block diagram illustrating an optical network interface unit (ONI) provided for each subscriber in the system of FIG. 1.

Referring now to FIG. 3, the ONI 30 is illustrated in more detail. The ONI serves to select, for supply to each of the coaxial cables 48 and hence to each VPC 40, 2 of the 4 digital video signals which are present or can be supplied in the downstream signal on the fiber 10.

To this end, the ONI 30 includes a selector 310 and a control unit 312. The downstream signal on the fiber 10 is coupled via a directional optical coupler 314 to an electro-optical receiver 316, which supplies the resulting 435.2Mb/s multiplexed digital signal to a demultiplexer 318. The demultiplexer 318 demultiplexes this digital signal to produce the 4 video signals, which it supplies with the corresponding channel identities to the selector 310, and the message channel or X bits which it supplies to a message channel interface unit 320. The interface unit 320 is coupled to the control unit 312 for bidirectional communications therewith; accordingly, it also provides an upstream message channel at a bit rate of 2.56Mb/s via an electro-optical transmitter 322 and the coupler 314 to the fiber 10. This upstream message channel is conveniently Manchester encoded in the interface unit 320, decoding being performed in the unit 228 of the VSS 20, and has a similar frame format to that of the downstream message channel as shown in FIG. 6. These message channels provide for bidirectional communications between the control units 312 and 224 for the purposes described further below.

Correspondingly, the control unit 312 communicates bidirectionally, with a control unit in each VPC 40 as described below, via a serial communications interface unit 324. The ONI 30 further includes, for each VPC 40, an AMI (alternate mark inversion) encoder 326 and a coaxial cable interface unit 328.

Figure 7:
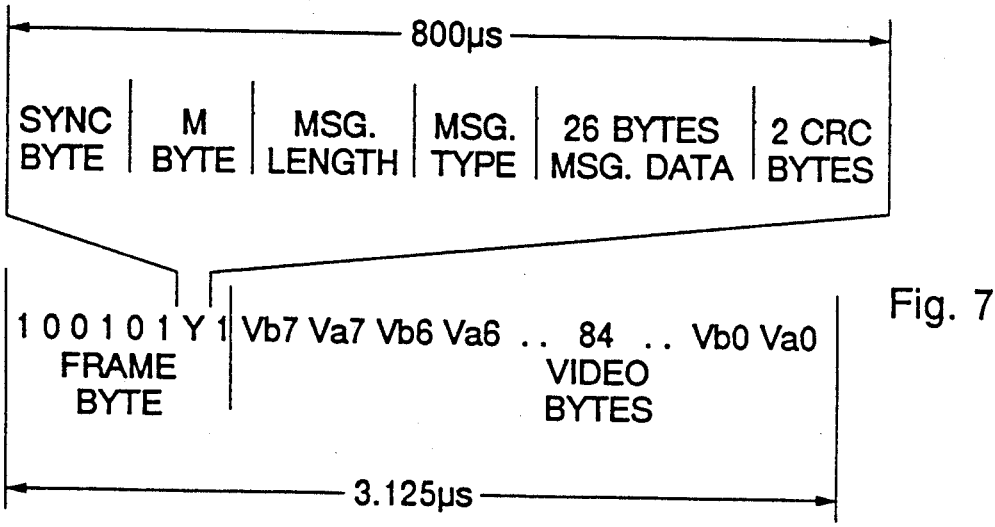
FIG. 7 illustrates a tdm frame format of an ONI-to-VPC signal.

Under the control of the control unit 312 the selector 310, which supplies the C bits (channel identity bits) to the control unit 312, supplies to each of its outputs a multiplexed digital signal at a bit rate of 217.6Mb/s, comprising the respective selected 2 digital video channels together with a downstream message channel from the control unit 312 supplied via the serial communications interface unit 324 to an input of the selector 310. Each such multiplexed signal, having a frame format as described below with reference to FIG. 7, is encoded by the respective AMI encoder 326 and supplied via the respective coaxial cable interface unit 328 to the respective coaxial cable 48. In the upstream direction, a message channel having a similar frame format is supplied from the respective cable 48 via the respective unit 328 to the serial communications interface unit 324 and thence to the control unit 312.

Referring to FIG. 7, the frame format of each 217.6Mb/s multiplexed signal comprises frames with a period of 3.125us, and hence comprising 680 bits or 85 bytes, of which a first byte is a frame byte having the form 100101Y1, where Y is a bit of the message channel. The remaining 84 bytes are video bytes of the 2 selected video channels, bit interleaved in the same manner as described with reference to FIG. 6. Thus if the 2 selected channels are the channels a and b, these bytes have the bit sequence Vb7, Va7, Vb6, Va6, ...Vb0, Va0 as illustrated in FIG. 5.

The Y bits in a superframe of 256 frames, and hence in a superframe period of 800us, form the downstream message channel with a frame format as shown in FIG. 7. Each message frame comprises 32 bytes consisting sequentially of an initial synchronizing byte (hexadecimal 69), a mode or M byte, 28 message bytes comprising a message length byte, a message type byte, and 26 data bytes, and two cyclic redundancy check (CRC) bytes.

Thus each 217.6Mb/s downstream signal comprises 2 digital video signals each having an average bit rate of 107.52Mb/s, the Y bits having a bit rate of 320kb/s, and framing bits at an average bit rate of 2.24Mb/s. The upstream signal on each cable 48, having as indicated above a similar frame format to that of the Y bits as shown in FIG. 7, has a bit rate of 160kb/s with a frame period of 1.6ms, and is conveniently Manchester encoded as for the upstream message channel on the fiber 10. The downstream and upstream signals on each cable 48 are separated in frequency by filters in the coaxial cable interface unit 328, as they have widely different frequencies.

Figure 4:
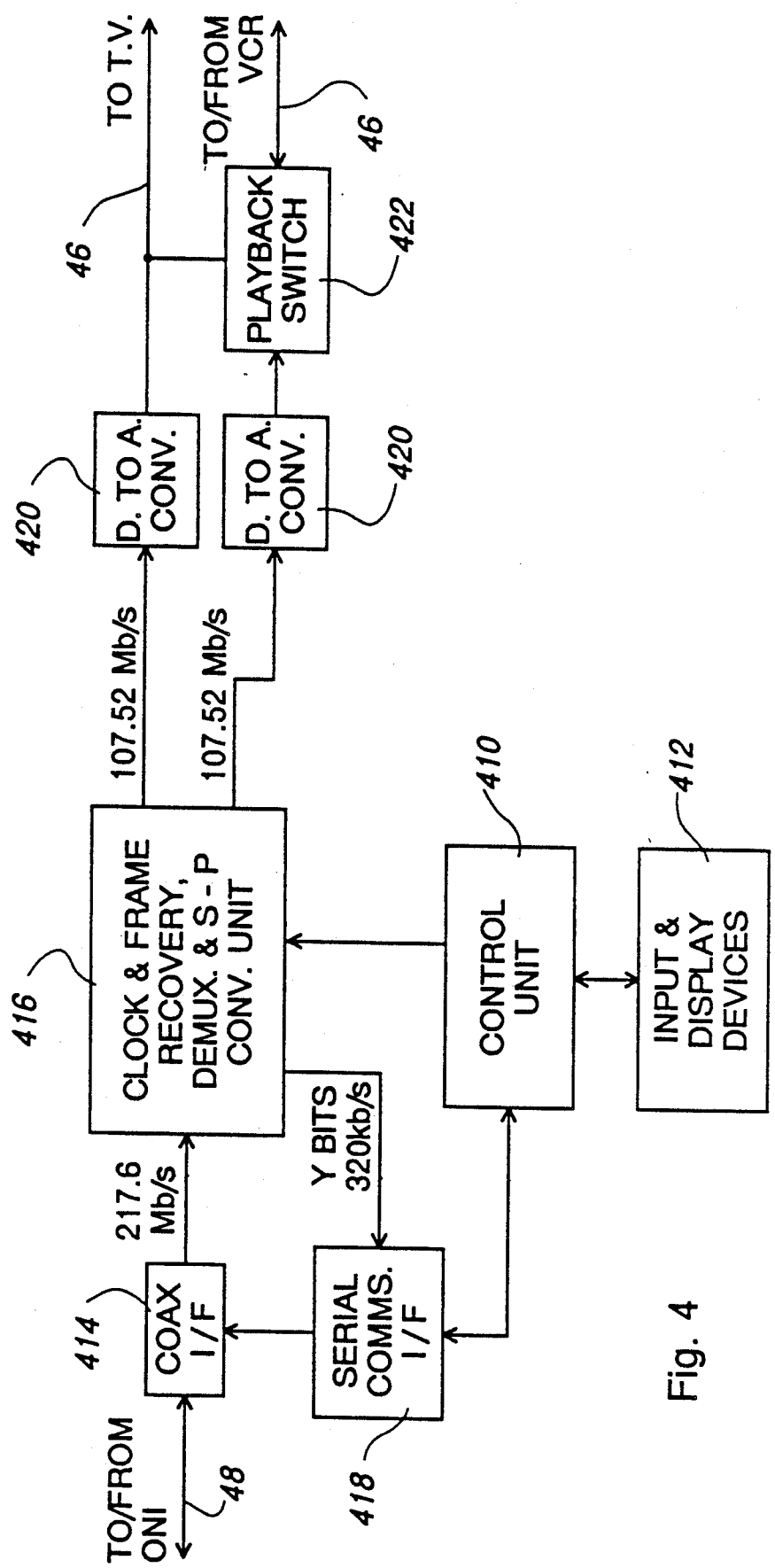
FIG. 4 is a block diagram illustrating a video port controller (VPC) in the system of FIG. 1.

Referring to FIG. 4, each VPC 40 comprises a control unit 410 as indicated above, input and display devices 412 connected thereto, a coaxial cable interface unit 414 similar to the unit 328, a clock and frame recovery, demultiplexer, and serial-to-parallel converter unit 416, a serial communications interface unit 418, two digital-to-analog converters (DACs) 420, and a VCR playback switch 422. The DACs 420 are the converse of the ADCs 210, and are preferably as described in the previously mentioned patent application. The coaxial cable interface unit 414 supplies the 217.6Mb/s downstream signal to the unit 416, which supplies the 2 107.52Mb/s digital video signals one to each of the DACs 420 for supply respectively to the TV 42 and to the VCR 44 via the playback switch 422, which enables playback of programs from the VCR to the TV. The unit 416 also supplies the downstream Y bits or message channel at 320kb/s to the serial communications interface unit 418 and thence to the control unit 410. In the upstream direction, the 160kb/s message channel is provided from the control unit 410 via the serial communications interface unit 418 and the coaxial cable interface unit 414 to the coaxial cable 48.

The input and display devices 412 can comprise conventional units, such as a 7-segment display unit for displaying selected channel numbers and other information, and a keyboard and/or an infrared remote control device for entering channel selections. These devices are coupled to the control unit 410 for human selection of television programs.

From the above description it should be appreciated that message channel communications are provided in both the downstream and upstream directions between the control units of each VPC 40 and the associated ONI 30, and between the control units of each ONI 30 and the VSS 20. Such communications can be used for program selection and confirmation in the manner described below, and additionally for maintenance and administration purposes.

In addition, it should be appreciated that the VSS 20 provides a 4 from 64 selection of video signals for each ONI 30, and each ONI 30 in turn provides a 2 from 4 selection of these video signals for each VPC 40. The manner in which such selections are accommodated using the message channel communications is described below. In this following description, references are made for convenience to communications between the VPC and ONI and between the ONI and VSS; it should be understood that these references actually refer to communications between the control units of these units.

The 64 video signals can comprise television programs of three types: broadcast program channels which are available to all subscribers; pay-per-channel (PPC) program channels which are available only to those subscribers who pay to receive the particular program channel; and pay-per-view (PPV) programs for which a subscriber must enter a predetermined access code to receive the particular program. To this end, the VSS 20 (or CATV equipment with which the VSS 20 communicates) maintains in memory a subscriber access record, or provisioning map as referred to above, recording for each subscriber any PPC channels available to, and PPV access codes for, that subscriber.

In operation, the VSS maintains for each subscriber a record of the four channels which are requested by the subscriber. For each subscriber, the ONI polls each VPC periodically for possible messages which may indicate desired channel selection changes, and may communicate such changes to the VSS as new channel requests to be recognized and, if appropriate, acted upon.

Initially, suppose that a subscriber at a VPC requests a new channel, via the keyboard or infra-red remote control device of that VPC. the VPC queues this request until it is next polled by the ONI (via the Y bit message channel), whereupon the VPC submits the channel request via the upstream message channel to the ONI. If all 4 video channels a to d available on the fiber 10 are already in use (by other VPCs of the same subscriber), and none of these is the requested channel, then the ONI communicates to the VPC via the Y bit channel that the new channel request is denied, and a corresponding message is displayed by the VPC on its display device. If, on the other hand, the requested channel is already being received via the fiber 10 as one of the channels a to d, then the ONI controls the respective selector 310 to supply this channel as one of the video channels to the VPC together with a Y bit message indicating that the request has been granted, a corresponding message being displayed by the display device of the VPC.

If neither of the above conditions is fulfilled, i.e. if there is at least one of the video channels a to d free and the requested channel is not already being supplied to the ONI via the fiber 10, then the ONI allocates for the request one of the video channels a to d which is free, so that subsequent requests do not result in conflicts, and forwards the request on the upstream message channel to the VSS, where the request is detected. If the request is for a broadcast channel, or for a PPC channel which is available to this subscriber, then the VSS controls the selector 220 to supply the requested program channel as the allocated one of the channels a to d on the fiber 10, and communicates via the X bits a message to the ONI indicating granting of the request. The ONI controls the respective selector 310 accordingly to supply the channel to the VPC, with a Y bit message indicating grant of the request as above. If the request is for a PPC channel which is not available to the subscriber, the VSS supplies an X bit denial message to the ONI, and this is forwarded to the VPC and displayed, the allocated one of the channels a to d subsequently being freed.

If the request forwarded to the VSS is for a PPV program, a longer sequence of communications takes place in a similar manner, involving for example a request from the VSS via the ONI to the VPC for an access code, return of this code (entered by the subscriber) from the VPC via the ONI to the VSS with verification of the access code, supply of the requested program for a timed preview period with a request to the VSS for confirmation to continue viewing, and either expiry of this period or confirmation and consequent billing. In each case, the messages between the VSS and ONI and between the ONI and VPC are conducted via the message channels as discussed above, using the X and Y bits in the downstream direction and the corresponding message bits in the upstream direction. In this situation, if the access code entered by the subscriber is incorrect and is therefore not verified, the VSS does not supply the requested program whereby unauthorized viewing of program signals is prevented.

Although a particular embodiment of the invention has been described in detail, it should be appreciated that numerous modifications, variations, and adaptations may be made thereto without departing from the scope of the invention as defined in the claims. In particular, the numbers, formats and frequencies of particular signals and units may all be varied to suit desired circumstances.

Furthermore, although the described embodiment of the invention uses digital transmission of video signals from the VSS via each ONI to each VPC, this need not be the case and analog transmission may instead be used partly or entirely. For example, the video signals may be transmitted digitally from the VSS to each ONI, where the selected video signals may be converted back into analog form for transmission to each VPC, for example as an r.f. modulated signal distributed via coaxial cable or other wiring.

We claim:

1. A signal distribution system for distributing video signals from a central location to a plurality of subscriber locations via respective communications paths, the system comprising, at the central location:

means for selecting for each subscriber location, from a first plurality of video signals a second, lesser, plurality of video signals and for delivering said second plurality of video signals to the respective subscriber location via a respective communications path;

and, at each subscriber location:

a plurality of control means each for supplying a respective video signal to at least one respective video signal receiver associated therewith; and interface means coupled to the respective communications path and to each control means for delivering respective video signals thereto;

wherein each control means comprises means for requesting delivery of any of the first plurality of video signals and for communicating such request to the interface means, and wherein the interface means comprises means responsive to such request for:

determining whether the requested video signal is one of said second plurality of video signals delivered thereto via the respective communications path;

if so, delivering the requested video signal to the respective control means; and if not, communicating a request for the requested video signal to the central location to be selected from the first plurality of video signals and delivered as one of the second plurality of video signals.

2. A system as claimed in claimed 1 wherein the interface means comprises means for supplying to each control means a third plurality, less than the second plurality, of video signals.

3. A system as claimed in claim 2 wherein the first, second, and third pluralities of video signals comprise at least about 64, 4, and 2 video signals respectively.

4. A system as claimed in claim 1 and including at the central location means for multiplexing with each selected signal an identification of the selected signal.

5. A system as claimed in claim 1 wherein each communications path comprises a digital signal communications path, the system further comprising at the central location means for supplying each of the first plurality of video signals as a digital signal.

6. A system as claimed in claim 5 wherein each control means comprises means for converting a respective digital video signal delivered thereto into an analog video signal for supply to the respective video signal receiver.

7. A system as claimed in claim 5 wherein the communications paths comprise optical fiber communications paths.

8. A method of distributing television program signals from a central location selectively to a plurality of subscriber locations, comprising the steps of:

at a plurality of points at a subscriber location, requesting television program signals for delivery thereto;

at the central location, selecting for the respective subscriber location a plurality of requested television program signals from a larger number of available television program signals;

supplying the selected signals from the central location to the subscriber location via a respective communications path; and at a central point at the subscriber location, receiving requests for television program signals from said plurality of points, receiving the selected signals from the central location via the respective communications path, determining whether requested television program signals are received from the central location and if so delivering the requested television program signals received from the central location to said plurality of points in dependence upon the received requests, and communicating to the central location requests for selecting television program signals at the central location for supply to the subscriber location.

9. A method as claimed in claim 8 wherein the television program signals are supplied as time division multiplexer digital signals via the respective communications paths.

* * * * *